W. J. PUGH.
STEERING HEAD LOCK FOR AUTOMOBILES.
APPLICATION FILED MAY 12, 1917.
1,262,978.
Patented Apr. 16, 1918.
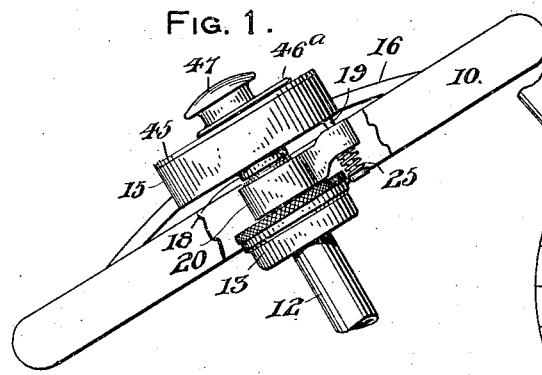
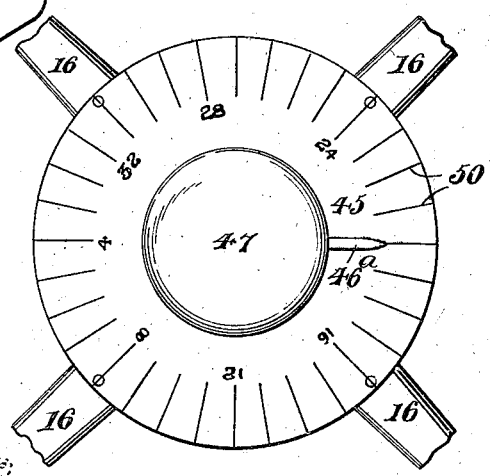
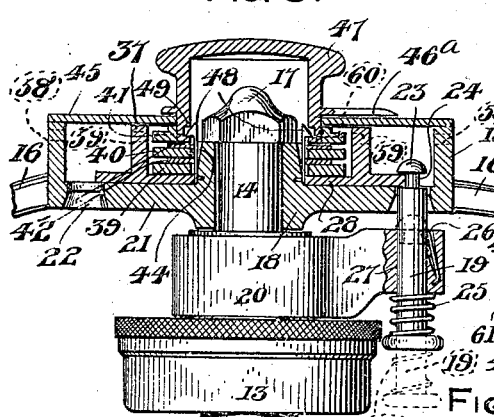
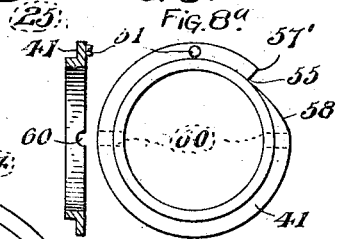
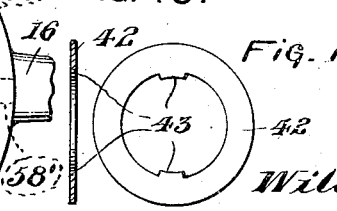
Inventor
William J. Pugh
By N. M. Wilson,
Attorney

UNITED STATES PATENT OFFICE.

WILLIAM J. PUGH, OF USK, WASHINGTON, ASSIGNOR OF ONE-HALF TO BENJAMIN F. HUFF, OF SEATTLE, WASHINGTON.

STEERING-HEAD LOCK FOR AUTOMOBILES.

1,262,978.  Specification of Letters Patent.  Patented Apr. 16, 1918.

Application filed May 12, 1917. Serial No. 168,125.

*To all whom it may concern:*

Be it known that I, WILLIAM J. PUGH, a citizen of the United States, residing at Usk, in the county of Pend Oreille and State of Washington, have invented certain new and useful Improvements in Steering-Head Locks for Automobiles, of which the following is a specification.

This invention relates to steering head locks for automobiles.

The primary object of the invention is the provision of a strong and efficient permutation lock for the steering heads of vehicles whereby the steering mechanism may be locked at a desired angle, thereby preventing the ordinary use of the vehicle.

A further object of the device is the provision of a locking means between the steering post and stationary sleeve of an automobile steering mechanism, the construction being such that the steering post may be locked at different positions by the operation of permutation members and released when desired by a person familiar with the combination.

A still further object of the device is to provide a permutation lock for steering heads having members releasable when the device is unlocked so that the structure may be disassembled for changing the combination of the lock or for other desired purposes, the entire structure being readily arranged upon an automobile steering head of any form.

In the drawings forming a part of this application and in which like designating characters refer to corresponding parts throughout the several views:—

Figure 1 is a side elevation of a steering head provided with the present device, the wheel being partially broken away.

Fig. 2 is a top plan view thereof.

Fig. 3 is a radial sectional view through the device with parts shown in side elevation.

Fig. 4 is a view similar to Fig. 2 with the turn knob and its associated parts removed.

Fig. 5 is a detail transverse sectional view through the central portion of the device.

Fig. 6 is an enlarged detail sectional view taken upon line VI—VI of Fig. 4.

Fig. 7 is a side elevational view of the slotted portion of the locking spider employed with the device.

Fig. 8 shows a sectional view of the upper permutation ring.

Fig. 8ª is a plan view of the same.

Fig. 9 shows a plan view of the intermediate ring.

Fig. 9ª is a sectional view of the same.

Fig. 10 is a sectional view of one of the spacing rings employed, and

Fig. 10ª is a plan view of the same.

The present invention is adaptable for locking any form of steering wheel such as the wheel 10 herein illustrated, the same being employed in a usual form of construction in which the steering post 11 is revolubly journaled within a sleeve or tubular casing 12 having a cup or gear case 13.

In the present construction an extension 14 is provided for the shaft 11 having a housing 15 concentrically keyed thereon and from which housing the spokes 16 of the wheel 10 radially project. The usual lock nut 17 is provided on the outer end of the shaft extension 14 firmly seated against the hub 18 forming the central portion of the housing 15.

A locking bolt 19 is longitudinally shiftably carried by a mounting arm 20 rigidly fixed to the cup 13 and sleeve 12 and preferably surrounding the shaft extension 14 with the latter freely journaled therethrough. The housing 15 has the bottom 21 thereof provided with a plurality, such as four, keeper openings 22 adapted to be brought into axial alinement with the bolt 19 upon turning the wheel 10, the said openings being preferably outwardly flared for the ready reception of the substantially semispherical head 23 of the bolt 19, it being noted that the bolt is provided with an annular engaging groove 24 which is positioned inwardly of the housing 15 when the bolt is projected in the manner hereinafter set forth.

An encircling spring 25 carried by the bolt 19 normally retains the latter in its retracted position while a leaf spring 26 arranged adjacent the outer end of the rim 20 and normally contacting the adjacent surface of the bolt 19 is adapted for entering the groove 24 when the bolt is retracted for preventing the withdrawal of the bolt from the bore 27 of the said arm within which the bolt is journaled.

A locking spider 28 is concentrically journaled upon the hub 18 and is provided with outwardly projecting lugs 29 adapted for reception within the groove 24 of the bolt 19 for locking the bolt to the housing 15 as herein fully illustrated.

The spider 28 has only a limited movement within the housing 15, a stop post 30 being carried by the bottom 21 for engaging one of the lugs 29 when the device is locked while a stop lug 31 is carried by the spider for limiting the movement of the latter during the releasing operation.

A latch bolt 32 is slidably positioned through a flange 33 of an outwardly projecting arm 34 of the spider 28, the latch bolt having a head 35 slidably positioned through a slot 36 in an annular upstanding wall 37 carried by the spider 28 arranged concentric with respect to the hub 18. A coil spring 38 is positioned between the flange 33 and the head 35 normally tending to force the latch 32 inwardly through the slot 36. Permutation members in the form of rings 39, 40 and 41 respectively, are arranged to revolve outwardly of the hub 18, in superposed spaced relations, the lower ring 39 and the intermediate ring 40 being revolubly journaled upon the said hub, a spacing ring 42 being positioned upon each side of the central ring 40 and having inwardly projecting lugs 43 arranged within opposite notches 44 of the hub 18 to prevent the spacing rings 42 from revolving relatively of the mounting hub 18.

A cover plate or cap 45 is arranged upon the housing 15 and suitably secured thereto, as by screws (not shown) which are received in apertures 46 provided therefor of the wall 56 of the housing 15, the said cap having a turn knob 47 centrally journaled through the plate with the outer permutation ring 41 keyed to a portion of the said knob that projects into the housing 15. Hook springs 48 are secured within the notches 44 for slight radial movement with respect to the housing 15 for engaging the hook portions thereof within an annular groove 49 of the knob 47 for maintaining the knob as well as the cover plate 45 upon the housing 15 even after the screws which secure the same have been removed. Appropriate graduations 50 may be arranged upon the cover plates 45 while an indicator or finger 46ª is carried by the knob 47 for overlying the said graduations.

With the device in its locked position as best illustrated in Figs. 1, 3 and 4 of the drawing, the knob 47 is turned when it is desired to unlock the device, thereby revolving the outer ring 41 therewith until a downwardly projecting pin 51 carried thereby comes in contact with the adjacent end of a similar pin 52 carried by the intermediate ring 40 whereupon the ring 40 is carried around with the ring 41 until the lower end of the pin 52 engages an upwardly projecting pin carried by the lower ring 39 which in turn is thereby revolved with the other two rings. The lower ring 39 being so revolved is provided with a notch 53 adapted to be brought into registry with the latch head 35 when the finger 46ª is positioned adjacent a predetermined member upon the dial 50. The knob 47 is then turned in a reverse direction until a similar notch 54 of the intermediate ring 40 is brought into alinement with the latch head 35 whereupon the knob 47 will be again reversed in its rotary movement until a notch 55 of the upper ring 41 is brought into alinement with the said head 35. The spring 38 then automatically projects the head 35 inwardly toward the hub 18 seating the said head within the said ring notches 53, 54 and 55 at which time the outer end of the latch 32 will be retracted inwardly of the outer wall 56 of the housing 15 through the perforation 57 thereof. This disengages the spider 28 from the housing 15 and permits the knob 47 to be turned for engaging the straight side or shoulder 57′ of the notch 55 with the head 35, thereby revolving the spider in the releasing direction as indicated by the arrow in Fig. 4 and forcing the engaging lug 29 from the bolt groove 24, the said releasing movement of the spider being limited by the engagement of the stop lug 31 thereof with the stop post 30. The bolt 19 being released in this manner, the spring 25 thereof automatically withdraws the said bolt 19 from the housing 15 permitting the free movement of the wheel 10 in the steering operation. In substantially a reverse manner, the device is locked, the knob 47 being turned in a reverse direction, brings the curved side 58 of the notch 55 of the upper ring 41 into engagement with the inner face of the head 35 and the outer end of the latch 32 being in engagement with the housing wall 56, the spider 28 is revolved until the latch bolt 32 comes into registry with the perforation 57 whereupon the continued turning of the knob 47 causes the inclined face 58 to ride upon the head 35 thereby projecting the latch bolt 32 through the perforation 57. It will be understood that the bolt 19 has been forcibly projected with its groove 24 inwardly of the housing 15 so that simultaneously with the projection of the latch bolt 32, one of the lugs 29 engages within the groove 24 of the locking bolt. It will of course be understood that whenever the latch bolt 32 is in its locked projected position, the permutation rings may be freely moved to any positions desired by means of the knob 47, thereby preventing the retraction of the latch bolt 32 until the combination has been again set for bringing the notches 53, 54 and 55 into alinement with the latch bolt head 35.

When the device is unlocked however, the engagement of the latch bolt head 35 within the notch 55 of the ring 41 prevents any relative movement of the separate permutation rings 39, 40 and 41 and only permits of the movement of the said rings with the spider 28 to the locking position of the latch bolt 32.

When it is desired to remove the cover plate 45 together with the knob 47 and outer ring 41, the screws which secure the plate are removed and the springs 48 are forced inwardly out of engagement with the knob groove 49 by means of two suitable instruments (not shown) which are projected through opposite perforations 58' in the housing wall 56 and through similar perforations 59 in the spider wall 37 as well as through bottom grooves 60 in the upper ring 41 and grooves 61 in the bottom of the knob 47. It will be evident that upon releasing the springs 48 and removing the screws the knob 47, cover plate 45 and upper ring 41 may be readily removed from the housing 15 while the rings 40 and 39 as well as the spacing rings 42 may then be easily removed as well as the spider 28.

A serviceable lock for preventing the theft of automobiles is arranged which is strong in its construction and highly efficient in its operation.

What I claim as new is:—

1. A device of the class described comprising in combination with a casing having a steering shaft journaled therethrough, an arm rigid with the casing, a housing mounted upon the said shaft having keeper openings therethrough, a normally retracted locking bolt carried by the said arm adapted for projecting through one of the said openings and having a groove adjacent its inner end adapted for positioning within the said housing, a spider revolubly arranged within the said housing having a locking lug positionable partially overlying each of the said openings adapted for engagement within the said bolt groove when the bolt is projected, and means for holding the spider and housing relatively immovable and controlling members for said last-named means and said spider.

2. A device of the class described comprising in combination with a casing having a steering shaft journaled therethrough, an arm rigid with the casing, a housing mounted upon said shaft having keeper openings therethrough, a normally retracted locking bolt carried by the said arm adapted for projecting through one of the said openings and having a groove adjacent its inner end adapted for positioning within the said housing, a spider revolubly arranged within the said housing having a locking lug positionable partially overlying each of the said openings adapted for engagement within the said bolt groove when the bolt is projected, means for limiting the rotary movement of said spider, and a spring-pressed latch carried by said spider, the said housing having a perforation therethrough adapted for the reception of the said latch when the spider and housing are locked.

3. A device of the class described comprising in combination with a casing having a steering shaft journaled therethrough, an arm rigid with the casing, a housing mounted upon the said shaft having keeper openings therethrough, a normally retracted locking bolt carried by the said arm adapted for projecting through one of the said openings and having a groove adjacent its inner end adapted for positioning within the said housing, a spider revolubly arranged within the said housing having a locking lug positionable partially overlying each of the said openings adapted for engagement within the said bolt groove when the bolt is projected, a spring-pressed latch carried by said spider, the said housing having a perforation therethrough adapted for the reception of the said latch when the spider and housing are locked, permutation members arranged within the said spider having notches adapted for positioning in the path of movement of the said latch bolt, and automatic retracting means for the said latch bolt when the said permutation members are so positioned.

4. An automobile lock comprising in combination with a stationary arm, a revoluble steering shaft positioned adjacent thereto, a housing fixed on the said shaft, a locking bolt carried by said arm adapted to project into the said housing at different positions of the said shaft, a spider within the housing having means for engagement with the bolt to hold the same against withdrawal, and permutation members controlling the operation of the said spider.

5. An automobile lock comprising in combination with a movable steering shaft, a housing secured thereto having keeper openings therein, a fixed arm, a slidable locking bolt carried by the said arm adapted for projecting within the said housing at different positions of the shaft, a locking spider revolubly journaled within said housing having locking lugs adapted for engaging the said bolt when positioned through one of the said openings, a locking latch for the said spider, and releasing means for the said latch.

6. An automobile lock comprising a fixed member, a steering shaft journaled therein, a housing having a hub secured to the said shaft, the said housing further having a plurality of keeper openings, a shiftable bolt carried by said fixed member adapted for projection through the said openings when the shaft is in different positions, a locking spider for the said bolt journaled upon the said shaft, permutation rings journaled upon said shaft, a cover plate for said housing, a turn knob centrally journaled through said plate having an annular groove, an upper permutation ring secured to the said knob within the said housing, and springs carried by the said hub normally engaging within the said knob groove.

7. An automobile lock comprising a fixed member, a steering shaft journaled therein, a housing having a hub secured to the said shaft, the said housing further having a plurality of keeper openings, a shiftable bolt carried by said fixed member adapted for projection through the said openings when the shaft is in different positions, a locking spider for the said bolt journaled upon the said shaft, permutation rings journaled upon said shaft, a cover plate for said housing, a turn knob centrally journaled through said plate having an annular groove, an upper permutation ring secured to the said knob within the said housing, springs carried by the said hub normally engaging within the said knob groove, the said housing, spider, outer ring and knob being provided with passages adapted for alinement whereby the said springs may be released upon the insertion of instruments therethrough.

In testimony whereof I affix my signature.

WILLIAM J. PUGH.

Copies of this patent may be obtained for five cents each, by addressing the "Commissioner of Patents, Washington, D. C."